(12) United States Patent
Genosar

(10) Patent No.: US 7,643,378 B2
(45) Date of Patent: Jan. 5, 2010

(54) PACKAGE SHOWING ELAPSED TIME SINCE OPENING

(76) Inventor: Amir Genosar, 4361 13th St., Boulder, CO (US) 80304

(\*) Notice: Subject to any disclaimer, the term of this patent is extended or adjusted under 35 U.S.C. 154(b) by 180 days.

(21) Appl. No.: 11/781,383

(22) Filed: Jul. 23, 2007

(65) Prior Publication Data
US 2008/0023362 A1 Jan. 31, 2008

Related U.S. Application Data

(60) Provisional application No. 60/832,884, filed on Jul. 25, 2006.

(51) Int. Cl.
G04F 7/00 (2006.01)
B65D 85/00 (2006.01)

(52) U.S. Cl. .................. 368/10; 368/89; 368/327; 206/459.1; 383/5; 383/61.3; 428/35.2

(58) Field of Classification Search .................. 368/10, 368/327, 89; 206/459.1, 459.5; 383/5, 61.3; 428/35.2, 131
See application file for complete search history.

(56) References Cited

U.S. PATENT DOCUMENTS

| | | | | |
|---|---|---|---|---|
| 4,292,916 A * | 10/1981 | Bradley et al. ............... 116/205 |
| 4,408,557 A * | 10/1983 | Bradley et al. ............... 116/206 |
| 4,603,327 A * | 7/1986 | Leonard et al. ........... 340/573.1 |
| 5,053,339 A * | 10/1991 | Patel ............................... 436/2 |
| 5,058,088 A * | 10/1991 | Haas et al. .................... 368/327 |
| 5,446,705 A * | 8/1995 | Haas et al. .................... 368/327 |
| 5,555,223 A * | 9/1996 | Barainsky ...................... 368/10 |
| 5,633,835 A * | 5/1997 | Haas et al. .................... 368/327 |
| 6,224,751 B1 * | 5/2001 | Hofmann et al. .............. 210/85 |
| 6,292,438 B1 * | 9/2001 | Jones ........................... 368/10 |
| 6,373,786 B1 * | 4/2002 | Kagan et al. ................... 368/10 |
| 6,588,593 B2 * | 7/2003 | Woskoski ................. 206/459.1 |
| 6,637,909 B1 * | 10/2003 | Bryan ......................... 362/156 |
| 6,741,523 B1 * | 5/2004 | Bommarito et al. ......... 368/327 |
| 6,817,192 B2 * | 11/2004 | Ector et al. .................... 62/125 |
| 6,916,116 B2 * | 7/2005 | Diekmann et al. ........... 374/102 |
| 7,212,955 B2 * | 5/2007 | Kirshenbaum et al. ...... 702/187 |
| 7,239,247 B2 * | 7/2007 | Adams ......................... 340/652 |
| 7,307,524 B2 * | 12/2007 | Adams ..................... 340/545.6 |
| 7,388,814 B2 * | 6/2008 | Teffenhart et al. .......... 368/327 |
| 7,450,014 B2 * | 11/2008 | Farhadian ................. 340/573.1 |
| 2005/0241976 A1 * | 11/2005 | Britto et al. ............... 206/459.1 |
| 2006/0032774 A1 * | 2/2006 | Norrby et al. ............. 206/459.1 |
| 2006/0227669 A1 * | 10/2006 | Pennaz et al. ............... 368/327 |
| 2007/0294148 A1 * | 12/2007 | Stolmeier et al. ............. 705/28 |

\* cited by examiner

Primary Examiner—Vit W Miska
Assistant Examiner—Sean Kayes

(57) ABSTRACT

An at least partially flexible sealed package having an opening assembly, said opening assembly further comprising a sliding component and a lifetime indicator; the movement of said sliding component serving to open a seal of said package; the arrangement being such that the movement of said sliding component activates said lifetime indicator due to the relative motion between said sliding component and at least part of said lifetime indicator; such that said lifetime indicator can thereby providing a visual indication of the expiry status of the product within said package from the time of opening onwards.

7 Claims, 6 Drawing Sheets

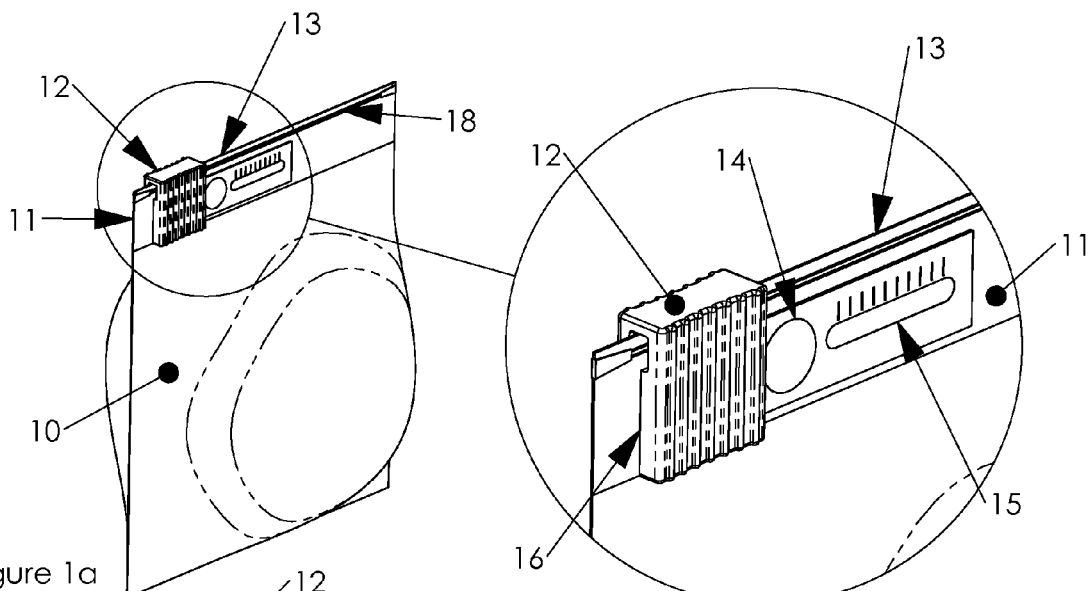
Figure 1a
Figure 1b
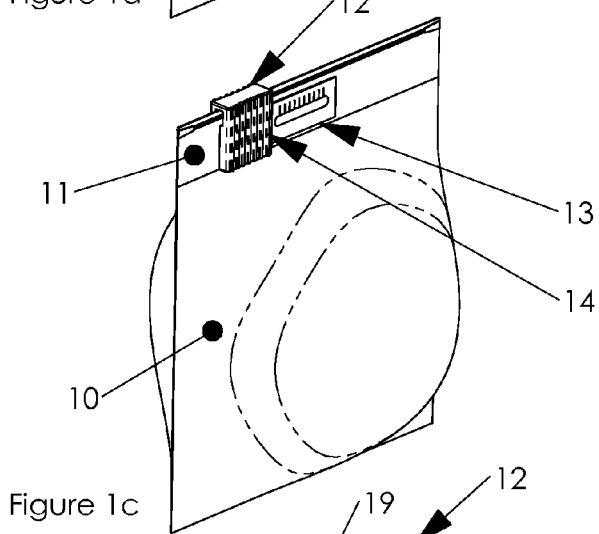
Figure 1c
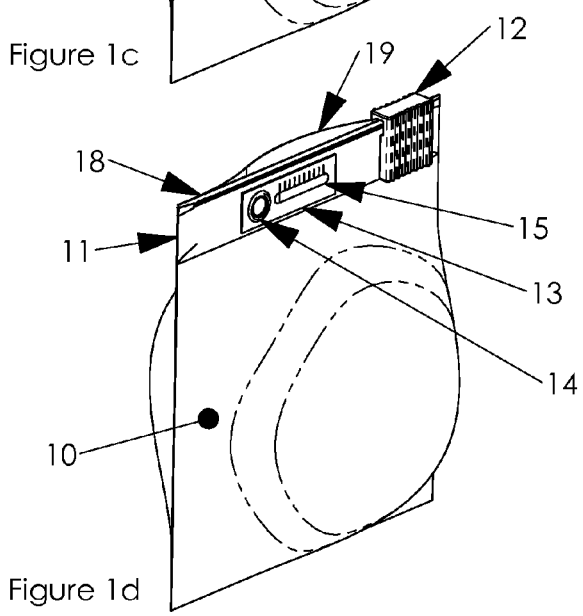
Figure 1d

PACKAGE SHOWING ELAPSED TIME SINCE OPENING

CROSS-REFERENCE TO RELATED APPLICATION

This application is a continuation of Provisional Application US60/832,884 filed Jul. 25, 2006.

FIELD OF THE INVENTION

The present invention relates to a flexible package for foods, medicines, and other perishables. More particularly, the invention relates to a package incorporating a slider assembly for opening it, where said assembly incorporates a lifetime indicator.

BACKGROUND OF THE INVENTION

Consumer awareness of product freshness has led to the widespread practice of addressing this issue by means of appropriate product labeling. Where relevant, the label will typically provide information related to the freshness and suggested storage method of the product. This information may include a date of manufacture, a "sell by" date, or a "best before" date. A "sell by" date specifies by which date the product should have been sold to the consumer. A "best before" date specifies by when the product should be disposed of by vendor or consumer.

The recommended storage method typically specifies whether the product is to be stored in the refrigerator or freezer and whether this storage method is to be used from the time of purchase or from the time of first opening. The former method is typically used for dairy products, whereas the latter method is usually more appropriate for jams, sauces conserves and liquid medications. For some items the labeling will also specify for how long the product may be kept after it has first been opened. The reasoning behind this is that if the product is produced and packed under conditions that eliminate deterioration, such deterioration will only occur following this first opening. Alternatively, product deterioration may commence at manufacture, but be dramatically accelerated once it is exposed to air. In either case, it is important to monitor the time since opening and not just the marked shelf-life.

A number of products have been developed and commercialized that implement the concept of active labeling. These products contain a chemical system or liquid migration system which provides a color change over time, either as a function of elapsed time since activation, or by integrating time and temperature since activation. The latter are termed TTIs (time-temperature indicators) whereas the former primarily indicate the passage of time. Herein both types of indicator are referred to generically as "lifetime indicators" or simply "indicators". The specifications of a TTI can be set to emulate those of the foodstuff in the package. Thus, given that the TTI placed on the package and activated as the food is produced, the TTI gives an accurate indication of the food freshness which takes into account the vagaries of the distribution chain. In particular, if the product has not been maintained at the appropriate temperature through a part of the distribution chain, the TTI may give the consumer an indication thereof.

U.S. Pat. Nos. 4,292,916, 5,053,339 5,446,705 and 5,633,835 describe color changing devices for monitoring the shelf-life of perishable products. These devices are initiated by physically bringing into contact reactive layers so that the reaction will start, and this action can only conveniently be performed at the time of packaging. This approach is suitable for monitoring the degradation of foodstuffs which lose freshness throughout the entire distribution chain. U.S. Pat. No. 5,555,223 describes a process for attaching timing indicators to packaging, including the step of setting the timer clock at the exact time of production.

There is a substantial proportion of food and drug stuffs, and other perishables for which significant degradation starts to occur only when the package is opened. U.S. Pat. No. 6,373,786, by the present author, hereby incorporated by reference, addresses this issue for rigid containers incorporating a rigid cap or closure. Said patent describes the integration of a lifetime indicator into the cap or closure, such that the first opening of the cap activates the lifetime indicator. In this manner, the thus incorporated lifetime indicator will show the elapsed time or time-temperature integral since the container was first opened. However, while said patent provides a good solution for rigid containers such as bottles and cartons which have a closure, many types of food, drugs and other perishables are packaged in at least partially flexible packaging such as plastic bags or shrink seal packages, and for these packages attaching the existing timers and TTIs is likely to produce misleading results in that they have no simple and foolproof means of activation at the time of opening the package.

It is therefore the intention of the present invention to obviate the shortcomings of the above-mentioned solutions by providing a simple and appropriate means of activating a lifetime indicator on first opening of an at least partially flexible package for foodstuffs medicines and other perishables, which have long shelf lives but deteriorate after opening. Thus, in the present invention, a key element is the use of an opening method which activates the lifetime indicator.

SUMMARY OF THE INVENTION

It is therefore the object of the present invention to provide lifetime indication for foodstuffs medicines or other perishable which have long shelf lives but which start to deteriorate significantly after initial opening of the package. It is a further object of the present invention to ensure maximum ease of use and foolproof operation by ensuring that the action of opening the at least partially flexible package activates the indicator.

Most packaged foodstuffs are clearly marked with a best buy or expiry date, and are often stable even well beyond these dates. However, certain foodstuffs, in particular meats and fish, deteriorate very rapidly after the initial opening. So while the expiry status of a packaged food product can be gauged by the date printed on the package before it is opened, its expiry status after opening is a different matter entirely. For example, according to United States Department of Agriculture (USDA) guidelines: hot dogs can be safely kept in an unopened package for 2 weeks but only for 1 week after opening; luncheon meats can be kept in an unopened package for 2 weeks but only 3-5 days after opening; and summer sausage marked "keep refrigerated" can be kept in an unopened package for 3 months but only for 3 weeks after opening (see: http://www.fsis.usda.gov/Fact Sheets/Refrigeration & Food Safety/index.asp). Thus the expiry status of certain foods is strictly dependent on the time of opening, and therefore the present invention serves to indicate said expiry status as it relates to such foods once their packaging is opened.

The present invention is an at least partially flexible sealed package comprising a flexible film and an opening assembly which serves to open said package. Said opening assembly incorporates a lifetime indicator to display the expiry status, the arrangement being such that that opening action of said assembly serves to activate said lifetime indicator. Commercial lifetime indicators suitable for integration into the package of the current invention include Timestrip® (Timestrip PLC, Hitchin, Herts, UK), VITSAB® (VITSAB AB, Malmö, Sweden), and MonitorMark™ (3M, St. Paul, Minn., USA); all of which may be activated by applying pressure to them. Further prior art includes U.S. Pat. No. 6,916,116 which describes a similar indicator. The opening assembly may comprise either a single-use or a re-closeable mechanism. In a preferred embodiment of a re-closeable mechanism, said mechanism is a zipper or slider-type opening mechanism. In a further preferred embodiment, said slider or zipper is similar to that of a Ziploc® bag (SC Johnson, Inc., WI, USA), in that it can be repeatedly closed and re-closed by sliding. In a preferred embodiment of a non-re-closeable mechanism, said mechanism may be a knife-type opener similar to the Easy-Cutter™ (Pliant Corp., Schaumburg, Ill., USA) which serves to cut off an edge of (or a sealed portion of) the package.

In a preferred embodiment of the present invention, said lifetime indicator is integrated into the opening mechanism of said opening assembly of said at least partially flexible package such that the opening of said mechanism activates the indicator.

In a further preferred embodiment, said lifetime indicator is integrated into a sliding mechanism of said opening assembly of said at least partially flexible package such that the first sliding of such mechanism activates the indicator.

In preferred embodiments of the present invention said lifetime indicator is either an elapsed time indicator or a time-temperature indicator (TTI), or a combination of the two.

In preferred embodiments of the present invention said assembly comprises at least two parts movable relative to each other, said relative motion serving to apply pressure to said lifetime indicator or otherwise cause its activation. Thus, according to the present invention there is now provided an at least partially flexible sealed package having an opening assembly, said opening assembly further comprising a sliding component and a lifetime indicator; the movement of said sliding component serving to open a seal of said package; the arrangement being such that the movement of said sliding component activates said lifetime indicator due to the relative motion between said sliding component and at least part of said lifetime indicator; such that said lifetime indicator can thereby providing a visual indication of the expiry status of the product within said package from the time of opening onwards. Said sliding element is selected from the group including a sliding knife and a zipper. Furthermore, said package may be re-closable, whether by use of the slider or due to any other closing mechanism such as snap-fit closures or adhesive. Said lifetime indicator comprises a blister containing a liquid, such that the rupturing of said blister activates said lifetime indicator. Said lifetime indicator is selected from the group including elapsed time indicators and time-temperature indicators and combinations thereof. The expiry status shown by the lifetime indicator represents a measurement index selected from the group including elapsed time and time-temperature integrals and combinations thereof. The type of said package is selected from the group including plastic bags, vacuum packed packages and blister packages. Films used for such packages may range from oriented polypropylene (OPP), laminated films and high-density polyethylene (HDPE).

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 1a is a perspective external view of a preferred embodiment of the at least partially flexible film package according to the invention; FIG. 1b is an exploded, cut-away view of FIG. 1a; and FIGS. 1c and 1d show the opening of said package.

DETAILED DESCRIPTION OF PREFERRED EXEMPLARY EMBODIMENTS

Figure 2A:
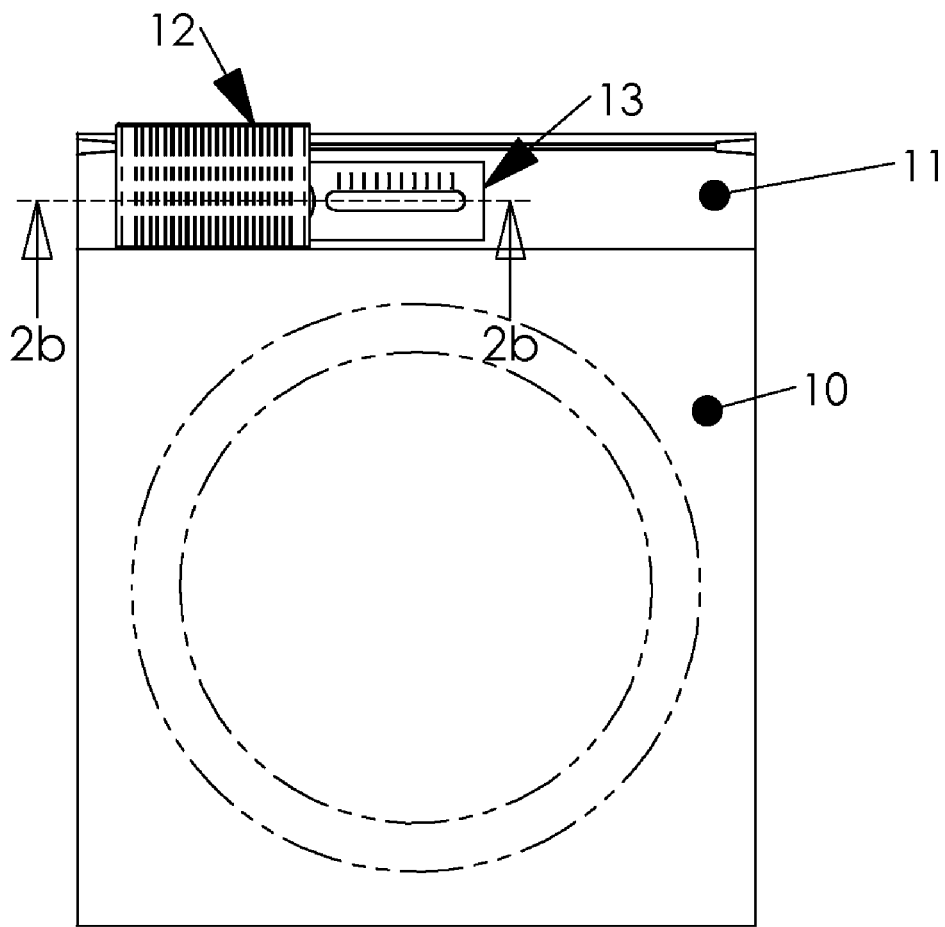
FIG. 2a is a planar view of a preferred embodiment of said package with a cross-section line marked on it.

FIG. 1a shows a preferred embodiment of the package of the present invention where said package comprises a plastic bag 10 with an opening assembly 11 for opening and closing said bag 10. In a preferred embodiment, said opening assembly 11 comprises a slider 12, sealing lips 18 which serve to seal the bag 10, and a lifetime indicator 13. Suitable lifetime indicators for inclusion in said package include any which can be activated by relative motion of the slider 12 and the lifetime indicator 13, such that the opening of the package causes the activation of said indicator. Referring now to FIG. 1b, an enlargement of the opening assembly 11 is shown, showing the details of a preferred embodiment of a lifetime indicator 13. Said indicator 13 comprises a blister 14 containing a liquid and a scale 15 showing the progress of time since activation of said indicator 13. Examples of suitable lifetime indicators that can be activated in this manner include Timestrip® (Timestrip PLC, Hitchin, Herts, UK), VITSAB® (VITSAB AB, Malmö, Sweden), and MonitorMark™ (3M, St. Paul, Minn., USA). Referring now to FIG. 1c and FIG. 1d, the location of the slider 12 before and after opening the package is shown. Note that, as the location of the slider 12 in FIG. 1*c* is directly to the left of the indicator 13, opening said package requires that the slider 12 must squeeze said blister 14 in order to traverse the indicator 13 and proceed toward the other side of the opening assembly 11. Said squeezing action activates the indicator 13 such the indicator is activated by this opening action of the package. As is the general manner in such zip or slider packages, the traversal of the slider 12 across the opening assembly 11 causes the sealing lips 18 to part into an open lip section 19 as shown in FIG. 1*d*; and this is the way in which the specific embodiment shown is opened. FIG. 1*d* also shows the blister 14 in its compressed or collapsed state, in which at least part of its liquid contents have been forced into other portions of the lifetime indicator 13 in order to activate the indicator.

Figure 2B:
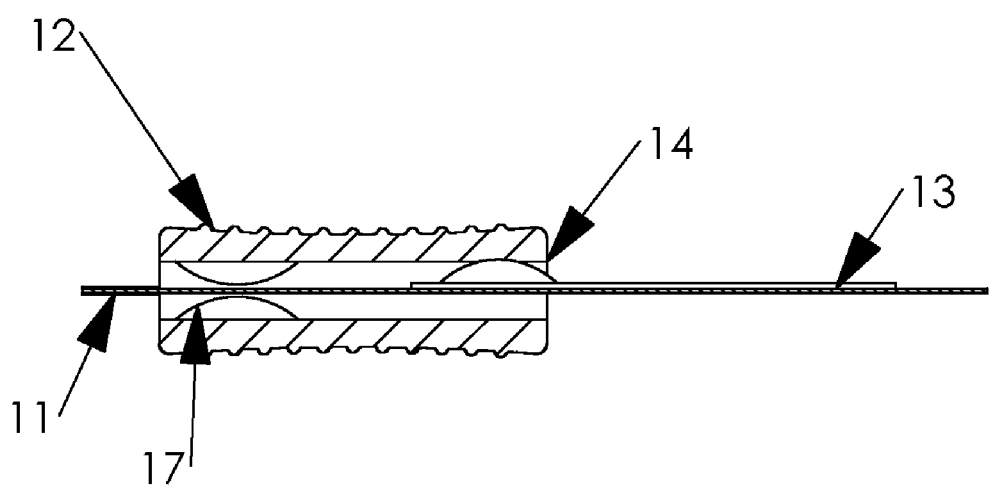
FIG. 2b shows the cross section along this line.

Referring now to FIG. 2, a further preferred embodiment of the package of the present invention is shown in which the blister 14 is concealed when the package is closed. Advantageously, this embodiment prevents both accidental activation and deliberate tampering whereby people press the blister while leaving the product on the shelf. FIG. 2*a* shows the package in its closed state where it can be seen that the blister section 14 of the lifetime indicator 13 is concealed within the slider 12. FIG. 2*b* provides a cross-sectional view of the slider 12 along the line marked. This view shows two protrusions 17 into the interior space of the slider 12. As the slider 12 is moved relative to the lifetime indicator 13, these protrusions serve to squeeze the blister 14, creating a situation that the package cannot be opened without said squeezing action occurring.

The indicator strip can be a prefabricated item that is introduced to the bag either by adhering or welding. In another embodiment the indicator 13 is integral to the package and the film provides one of the walls of the indicator. In this case the graphic area location is less limited and the indication fluid can be channeled to any location on the bag.

Referring now to FIG. 3, a further embodiment is demonstrated in which the indicator 23 is located on the slider assembly 12. Advantageously, having the indicator as part of the slider obviates several changes on the manufacturing line of the flexible film package as this combined slider/indicator can simply replace a regular slider. Thus, according to this preferred embodiment, the slider assembly 12 comprises two parts: a base 31 and a jockey 30. Said jockey 30 incorporates the features (not shown) that are responsible for opening and sealing the package 10 as said jockey 31 is moved from one side to the other of the opening assembly 11. FIG. 3*b* shows an enlarged isometric view of said jockey 30, showing the locations of the lifetime indicator 13 within, and its component parts the blister 14 and the scale 15. FIG. 3*c* and FIG. 3*d* show the two sides of the base 31. FIG. 3*c* shows the side of this base 31 which incorporates an elevated surface 32 with an inclined ramp reaching that elevated surface. Said elevated surface 32 serves to depress the blister 14 in the indicator 13 upon relative motion between the base 31 and the jockey 30. FIG. 3*d* shows the other side of the base 31, which incorporates a rocker arm 34 rotating on a pivot 35, said pivot 35 preferably being an integral molded feature of the base 31 and thus having the tendency to remain in a particular position. One tip of said rocker arm 34 ends with an elevated section 36 which is connected to the arm surface by an inclined ramp 35. Said rocker arm 34 serves as part of the locking mechanism by which the base 31 engages with the jockey 30 as described below.

Figure 3A:
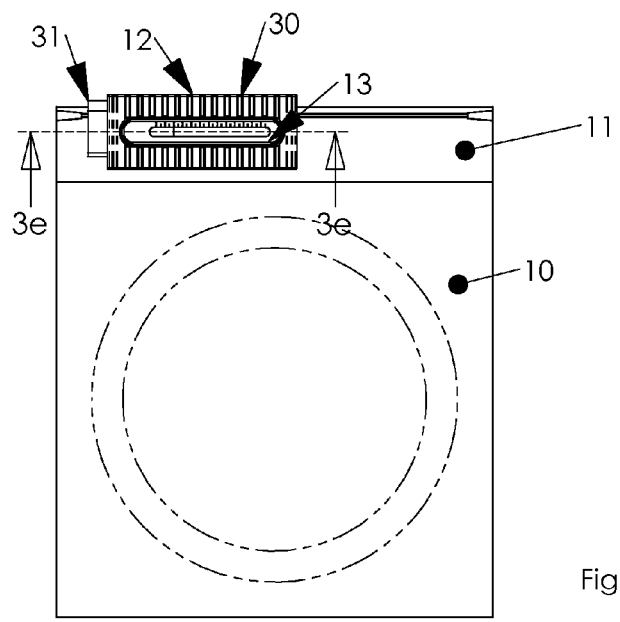
FIG. 3a is a planar view of a preferred embodiment of said package with a cross-section line marked through said package's rider-base opening mechanism.
Figure 3B:
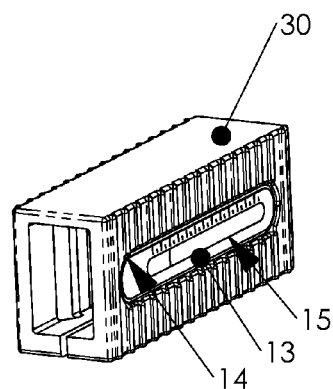
FIG. 3b is an isometric view of the jockey component of said mechanism.
Figure 3E:
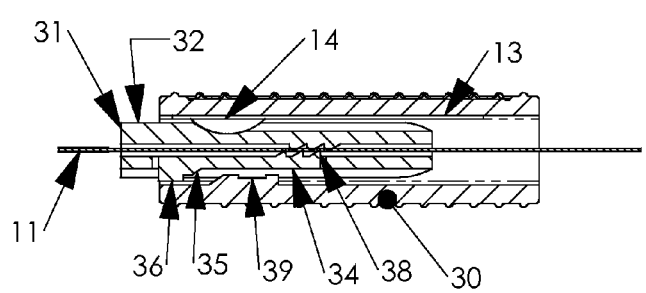
FIG. 3e and FIG. 3f are cross-sectional views through said rider-base opening mechanism, showing its closed (locked) state and its open (unlocked) state respectively.
Figure 3C:
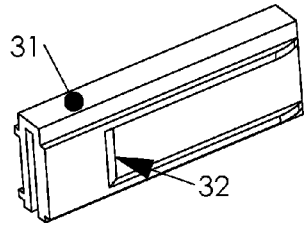
FIG. 3c and FIG. 3d are isometric view of two sides of the base component of said mechanism.
Figure 3F:
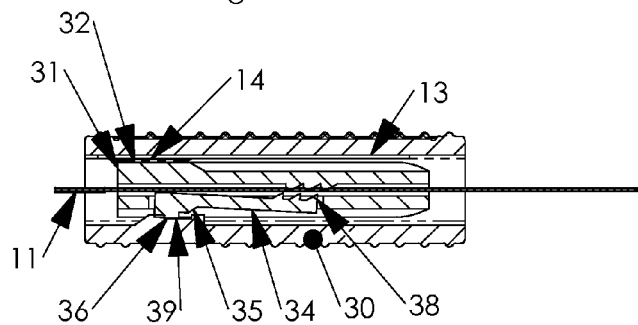
Figure 3D:
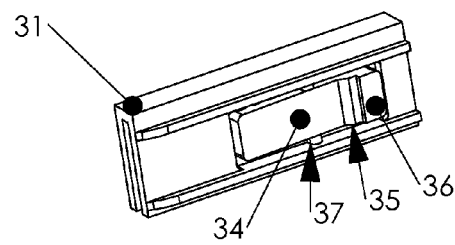
Figure 4:
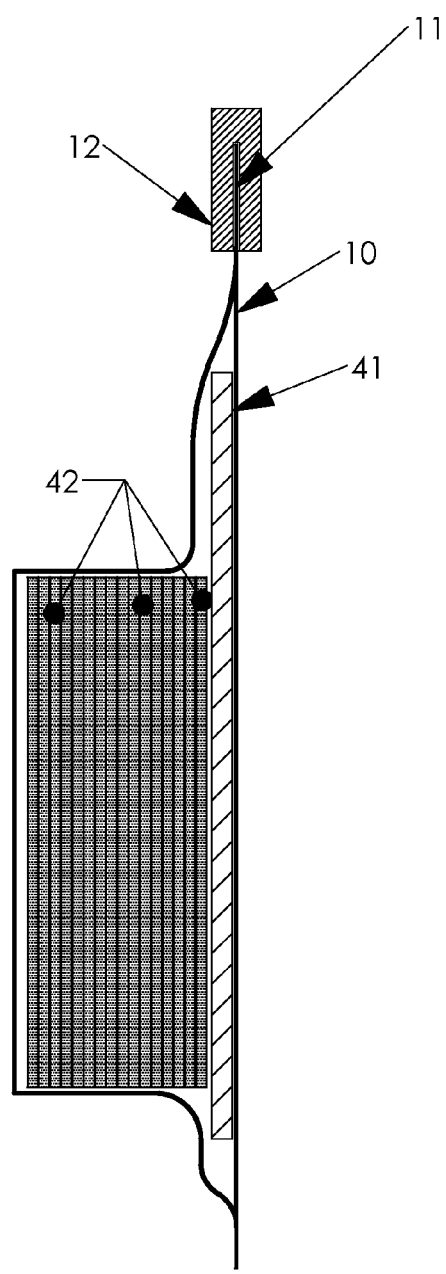
FIG. 4 is a cross-sectional view of a preferred embodiment of said package where said package is filled with contents.

FIG. 3*e* and FIG. 3*f* provide a partial section view of the combined base 31 and jockey 30 assembly shown in FIG. 3*a*. FIG. 3*a* shows this assembly in a pre-opening or locked position, whereas FIG. 3*f* shows the activated or open position. These views expose the internal side of the rocker arm 34, showing an array of teeth 38 located on the opposite end of said arm 34 relative to the elevated section 36. FIG. 3*e* shows said teeth 38 leaning against the bag 10, thereby preventing the base 31 from moving and opening the bag. The rocker arm 34 is maintained in this position due to its tendency to remain in its molding position. Referring now to FIG. 3*f*, the state in which the jockey 30 is slid to the left relative to the base 31 is shown. In this state, the blister 14 of the indicator 13 is depressed by the elevated ramp 32 of the base 31, followed by the deflection of the rocker arm 34 as its elevated section 36 engages into a recess in the protrusion 39 in a manner that the base 31 and jockey 30 can no longer be released from each other. Said deflection of the rocker arm 34 causes the teeth 38 of the rocker arm 34 to move away from the bag 10, enabling the entire assembly formed by the thus engaged base 31 and jockey 30 to be freely moved from side to side across the top of the package. Note that, as per the previously described embodiments, the depression of the blister 14 during such engagement action ensures that the lifetime indicator 13 is activated as the package is opened.

While the relative motion between the base 31 and the jockey 30 shown here is a linear sliding action, it will obvious to one skilled in the art the desired result can be achieved by other forms of relative action between these two parts including flipping, swiveling, rotating, bending, folding, pressing one into the other, etc. Furthermore, it will be obvious to one skilled in the art that the jockey 30 and the slide 31 can be fabricated as a single part. The key element is that the opening action of the package requires the depression of the blister 14, and the specific action depressing this blister 14 can be a swiveling action, a linear action, rotation or any other. It will be obvious to one skilled in the art that a similar mechanism can be implemented in embodiments where the lifetime indicator 13 is part of or is attached to the bag 10 as shown in FIG. 1 and FIG. 2.

Figures 5A, 5B, 5C:
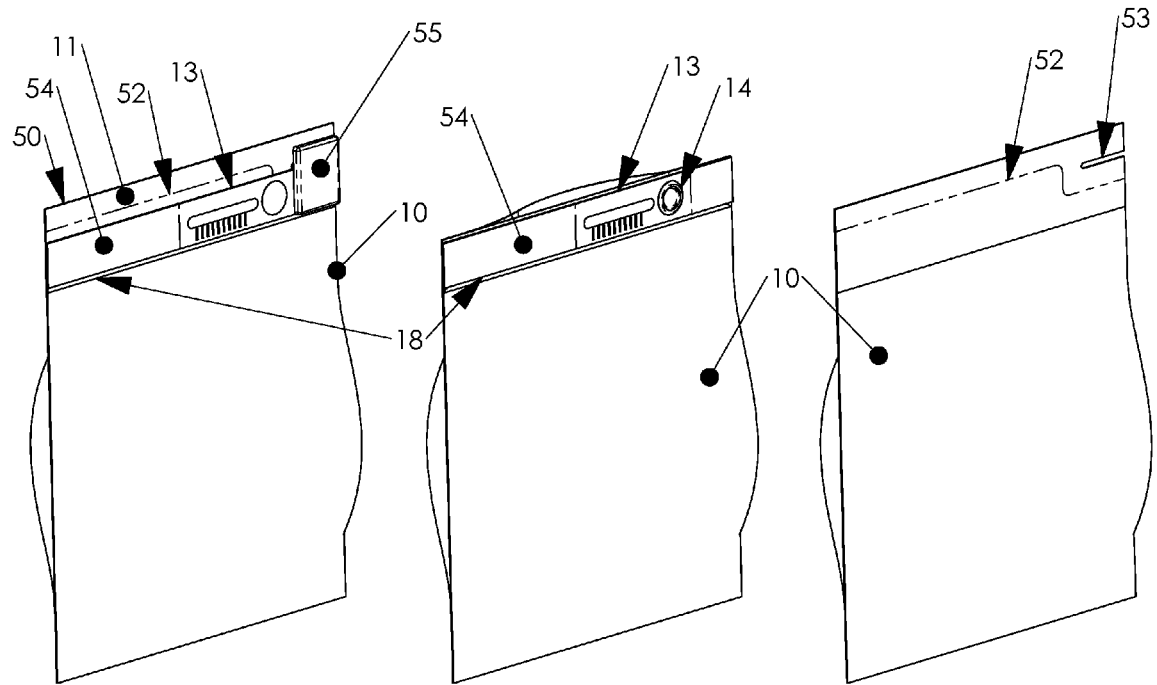
FIG. 5a, FIG. 5b and FIG. 5c are isometric views of a preferred embodiment of the package of the present invention, where

Referring now to FIG. 5, a further preferred embodiment of the package of the present invention is shown in which a cutting action is used to open the package. FIG. 5*a* shows a preferred embodiment, comprising a flexible bag section 10 and an opening assembly 11, said opening assembly 11 further comprising a removable strip 50, a permanent strip 54, a lifetime indicator 13 and a sliding knife 55. The arrangement is such that the movement of said sliding knife 50 across the opening assembly 11 trims-off the removable strip 50 from the permanent strip 54. As the sealing/welding line 52 passes within said removable strip 50, the cutting off of said removable strip 50 opens the seal on the package. Additionally, the movement of the sliding knife 55 over the lifetime indicator 13 activates said indicator 13 as per the descriptions associated with the previous figures, such that the opening of the seal on the package activates the lifetime indicator. The permanent strip 54 can serve to guide the line of the sliding knife 55. In a further preferred embodiment, guiding features may be formed in one or more of the package walls, eliminating the need for permanent strip 54. FIG. 5*b* shows the package after opening, where it can be seen that the blister 14 on the lifetime indicator 13 has been depressed. As will be obvious to one skilled in the art, said package may further comprise sealing lips 18 for manual snapping open and closed as shown in FIG. 5*a* and FIG. 5*b*; or such sealing lips 18 may not be included (as per FIG. 5*c*). FIG. 5*c* illustrates the sealed package of FIGS. 5*a* and 5*b* prior to assembly of the indicator 13 and the sliding knife 55, in order to emphasize the sealing line pattern 52 which encloses the area for locating the sliding knife 55 prior to opening.

Figures 5D, 5E:
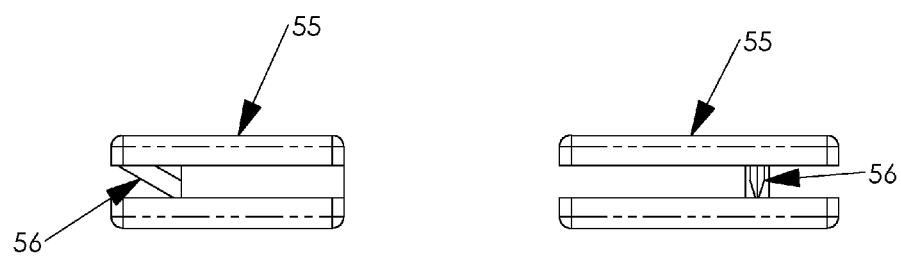
FIG. 5d and FIG. 5e present cross-sectional views of the sliding knife of said package.

Referring now to FIG. 5d and FIG. 5e, a bottom and side views (respectively) of the sliding knife 55 is shown, showing the internal cutting edge 56. An example of such a sliding knife 55 is the EasyCutter™ (Pliant Corp., Schaumburg, Ill., USA), but it will be obvious to one skilled in the art that the cutting edge 56 incorporated in the sliding knife 55 can be of any fashion known in the art including rolling blade, shearing element, sawing element, etc. Said sliding knife 55 can be made in one piece from extremely rigid molded plastic such as crystal polystyrene, or over molding of plastic material on a metal blade. Said sliding knife 50 will be engaged with the bag 10 in a form that the slider can not be removed until a complete opening of the bag.

Figure 6A:
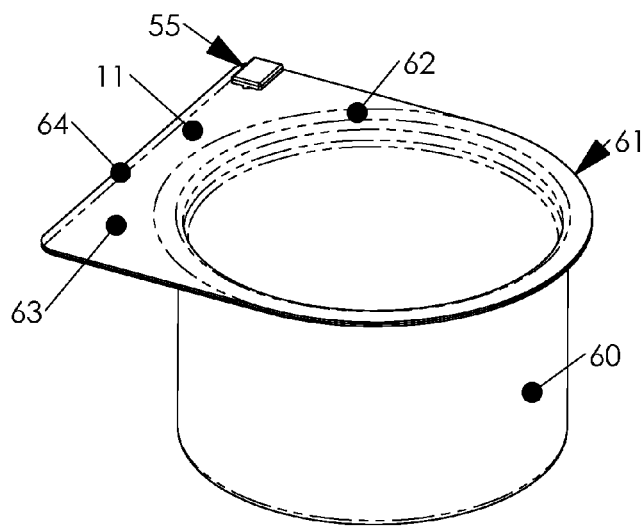
FIG. 6 provides isometric views of a preferred, blister style embodiment of the package of the present invention.
Figure 6B:
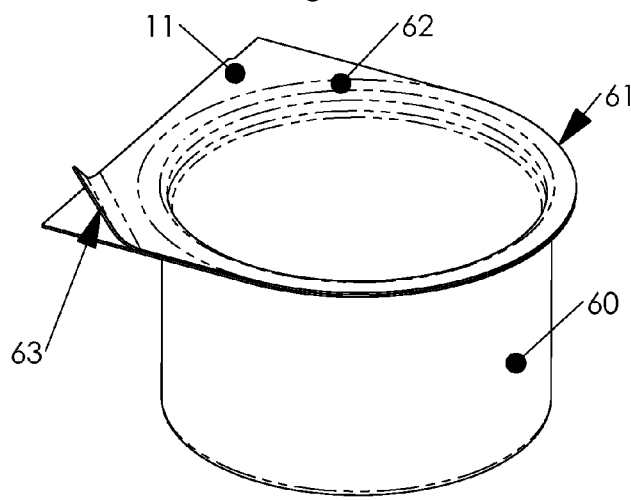
Figure 6C:
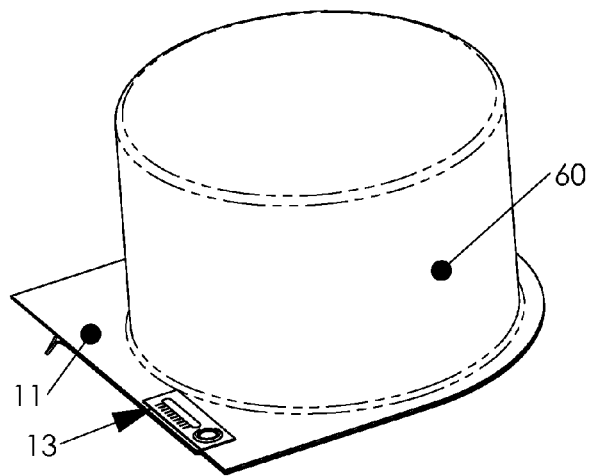

Referring now to FIG. 6, a preferred blister configuration of the package of the present invention is shown. Said package comprises a container 60 which may be flexible, semi-flexible or rigid; a flexible foil closure 61; and an opening assembly 11 further incorporating a sliding knife 55. A sealing portion 62 of said foil closure 61 is welded or adhered around the flange of said container 60, such that the container 60 can only be opened from a defined flap 63. In a preferred embodiment of said package, said flap 63 cannot be lifted to start the opening action as long as the edge 64 of said container 60 remains in position. Said edge 64 is the area of said flexible foil closure 61 which is firmly attached to the container flange and that thus prevents finger grip of the free flap 63 and thus prevents pulling open the closure 61. The sealing method of the sealing portion 62 can be of the type that allows a single opening, or may permit multiple opening and resealing. As described in connection with FIG. 5 above, a sliding knife 55 serves to open the package by cutting off this edge 64 as said sliding knife is moved across the opening assembly 11. Said opening assembly 11 and cutting line maybe straight (as shown) or be curved. Said opening assembly 11 further incorporates a lifetime indicator (shown in FIG. 6c), the arrangement being such that the movement of the sliding knife 55 across said opening assembly 11 causes the relative motion between the sliding knife 55 and the lifetime indicator 13 which activates said indicator 13. Said indicator 13 can be adhered to the package or constitute an integral part thereof. In a further preferred embodiment, said indicator 13 is protected from accidental activation by the sliding knife 55. In a further preferred embodiment, at least part of said indicator is viewable from the top of the package, whether via a transparent section thereof or otherwise.

Referring now to FIG. 6b, the package is shown in the state where the edge 64 has been removed such that the flap 63 is released for pulling. The completion of the opening action then entails the lifting of said flap 63 until the foil closure 61 exposes the package's contents. In a further preferred embodiment, the sliding knife 55 and the container are designed such that said sliding knife 55 remains on the package after opening.

In addition it will be obvious to one skilled in the art that the package of the present invention can further incorporate a tamper-evident feature, such that the action of opening the opening assembly 11 results in a visual non-reversible mechanical change in one or more of the parts.

It will thus be seen that according to the present invention a simple and inexpensive means of providing an at least partially flexible film package that shows a product lifetime indication based on the elapsed time or time-temperature integral since first opening of the container.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An at least partially flexible sealed package having an opening assembly, said opening assembly further comprising a sliding component and a lifetime indicator; the movement of said sliding component serving to open a seal of said package; the arrangement being such that the movement of said sliding component activates said lifetime indicator due to the relative motion between said sliding component and at least part of said lifetime indicator; such that said lifetime indicator can thereby providing a visual indication of the expiry status of the product within said package from the time of opening onwards.

2. The package of claim 1 where said sliding element is selected from the group including a sliding knife and a zipper.

3. The package of claim 1 where said package is re-closable.

4. The package of claim 1 where said lifetime indicator comprises a blister containing a liquid, such that the rupturing of said blister activates said lifetime indicator.

5. The package of claim 1 where said lifetime indicator is selected from the group including elapsed time indicators and time-temperature indicators and combinations thereof.

6. The package of claim 1 where said expiry status represents a measurement index selected from the group including elapsed time and time-temperature integrals and combinations thereof.

7. The package of claim 1 where the type of said package is selected from the group including plastic bags, vacuum packed packages and blister packages.

* * * * *